United States Patent [19]

Sutphin, Jr.

[11] Patent Number: 4,635,058

[45] Date of Patent: Jan. 6, 1987

[54] VEHICLE IDENTIFICATION SYSTEM USING RADAR AND ACOUSTIC INFORMATION

[75] Inventor: Eldon M. Sutphin, Jr., Hillsboro Township, Hillsboro County, N.H.

[73] Assignee: RCA Corporation, Princeton, N.J.

[21] Appl. No.: 561,271

[22] Filed: Dec. 14, 1983

[51] Int. Cl.$^4$ .............................................. G01S 13/86
[52] U.S. Cl. ..................................................... 342/52
[58] Field of Search .............. 343/6 R, 5 HE, 5 HM, 343/5 PD, 5 SA, 5 FT, 5 NQ, 7.7, 7 VM; 367/128

[56] References Cited

U.S. PATENT DOCUMENTS

| | | | |
|---|---|---|---|
| 3,733,603 | 5/1973 | Johnston | 343/5 SA |
| 3,846,778 | 11/1974 | Galvin et al. | 343/5 NQ |
| 4,204,171 | 5/1980 | Sutphin, Jr. | 328/167 |

OTHER PUBLICATIONS

*Radar Handbook*, M. I. Skolnik; (McGraw-Hill, 1970), pp. 25-23.

Primary Examiner—Theodore M. Blum
Assistant Examiner—Bernarr Earl Gregory
Attorney, Agent, or Firm—Joseph S. Tripoli; Robert L. Troike; Raymond E. Smiley

[57] ABSTRACT

A vehicle identification system includes a doppler radar producing a doppler frequency signal having noise components and having a value $f_D$ corresponding to the speed of the vehicle to be identified and a doppler frequency having a value $X \cdot f_D$ corresponding to the speed of the vehicle propelling means, each doppler frequency being modulated by signals corresponding to the movements made by individual elements of the vehicle propelling means. The doppler signal is passed through first and second adjustable filters adjusted to pass $f_D$ and $x \cdot f_D$ respectively and sidebands relating to the modulating signal. Amplitude detectors coupled to the outputs of the two filters remove the doppler frequencies leaving the modulating signals relating to the movement of the vehicle elements. The modulating signals are applied to an adjustable commutating filter adjusted to frequency by a signal corresponding to frequency $f_D$. The output signal from the commutating filter represents sounds made by the vehicle individual elements by which one can identify the vehicle as to type.

5 Claims, 7 Drawing Figures

VEHICLE IDENTIFICATION SYSTEM USING RADAR AND ACOUSTIC INFORMATION

This invention relates to a system for vehicle identification and more particularly to such a system which identifies the vehicle by the sounds it makes.

BACKGROUND OF THE INVENTION

There are situations, particularly on a battlefield, where it is desired to be able to identify the type of a distant vehicle which cannot be adequately seen due to low or no light or due to smoke and/or dust and cannot be adequately heard due to general noise. If the vehicle is an enemy tank or helicopter, for example, it is prudent to fire large shells or missiles to eliminate it. If, on the other hand, the vehicle is a jeep, it is not considered a serious threat and little or no action would be taken to eliminate that vehicle.

The human mind is outstanding at recognizing and categorizing sounds if the sounds can be isolated from others. The present invention makes use of this human trait.

SUMMARY OF THE INVENTION

In accordance with a preferred embodiment of the present invention a vehicle identification system for identifying a moving vehicle which includes vehicle propelling means having a portion moving at a multiple X of the speed of the vehicle, the propelling means comprising individual elements, comprises the combination of a means directing a continuous wave carrier signal toward the vehicle and for generating a signal including a frequency value $f_D$ in accordance with the speed of the vehicle which is modulated by the sounds made by the propelling means, the generated signal including a frequency $X \cdot f_D$ due to the motion of the portion of the propelling means moving at the multiple X which is also modulated by the sounds made by the propelling means. The identification system also includes means responsive to frequency $f_D$ for producing a control signal having a parameter corresponding to the value of $f_D$, a first filter responsive to the doppler frequencies and the control signal for passing only frequency $f_D$ and a band of frequencies thereabout relating to the modulation of the signal returned by the vehicle propelling means, a second filter responsive to the doppler frequencies and the control signal for passing only frequency $X \cdot f_D$ and a band of frequencies thereabout relating to the modulation due to movement of the individual elements of the vehicle propelling means, first means coupled to the first filter for removing the doppler frequency thus leaving the modulating signal and second means coupled to the output of the second filter for removing the doppler frequency thus leaving the modulating signal. The vehicle identification system also includes means receptive of the control signal and of at least one of the signals from the first and second means for producing a signal corresponding to the sound made by the vehicle propelling means individual elements as the vehicle moves whereby a determination of the type of vehicle may be made.

DETAILED DESCRIPTION

Figure 1:
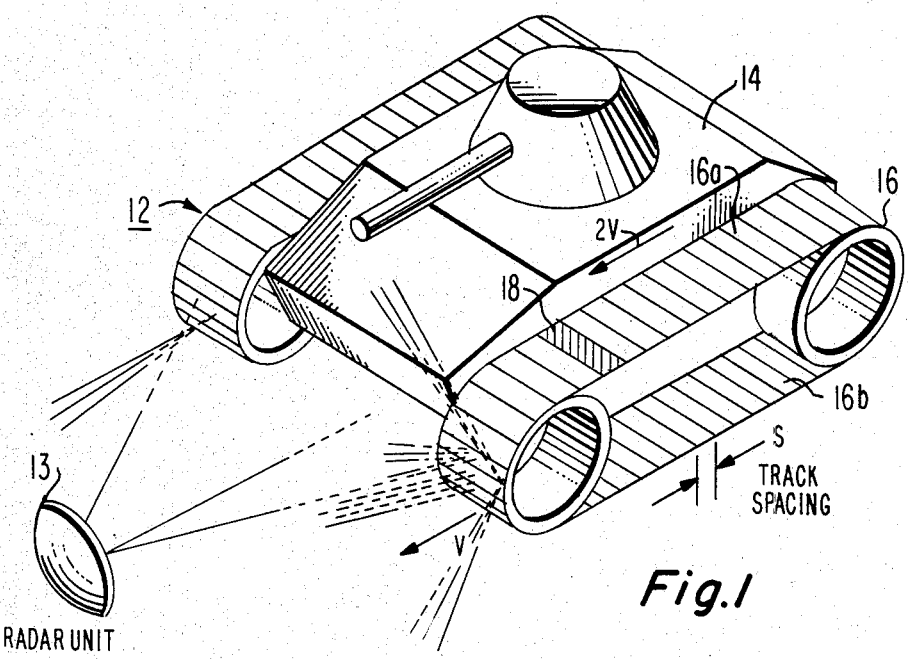
FIG. 1 is a vehicle to be identified by the sound it makes.

Referring to FIG. 1 a tank type vehicle 12 is illustrated. It will be realized that the vehicle is one of many on a battlefield and is obscured to an observer at the radar unit 13 (part of the vehicle identification system) due to terrain, dust, smoke and/or lack of light. An enemy tank is a major threat which ideally should be identified at a great distance and destroyed while an enemy jeep is at most only a minor threat. The body 14 of vehicle 12 is assumed to be moving at linear speed of V toward radar unit 13 which speed may, of course, change with time. Therefore, the upper portion 16a of tank propelling tracks 16 is moving at a linear velocity $2 \cdot V$ while the lower portion 16b being in contact with the ground (not shown) is not moving. Each track section such as 18 (including the width to the next successive track) is of width S. Therefore the rate at which the track sections slap the ground is a function of spacing S and vehicle velocity V. Further, the spacing S relates to the type of vehicle as different types of vehicles have different spacings. All in all a tank is a noisy vehicle which can easily be identified by an individual if the sounds made by the tank can be filtered from other sounds on the battlefield such as those made by people, guns, light vehicles, etc. Similar remarks apply to a helicopter which is also another noisy vehicle and which has a distinctive sound caused by the rotating blades. Hereinafter when a tank is referred to, reference could as readily be to a helicopter or other noisy vehicle which represents a threat.

Figure 2:
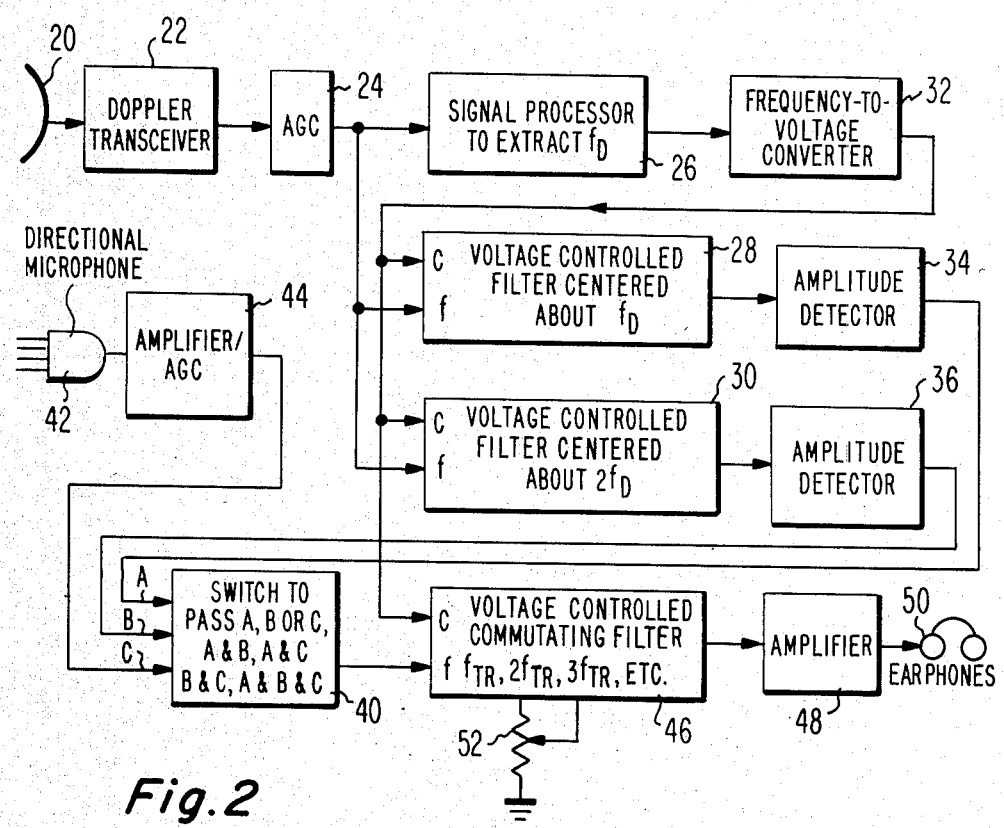
FIG. 2 is a vehicle identification system in electrical block diagram form.

A circuit for eliminating unwanted sounds and amplifying the tank sounds is illustrated in FIG. 2 to which attention is now directed. A transceiving high gain radar antenna 20 is connected to a doppler transceiver 22. Doppler transceiver 22 produces a continuous wave signal at a desired center frequency such as, for example, 94 gigahertz (gHz) which is transmitted by antenna 20 toward a target of interest (tank 12, FIG. 1 being an example).

Figure 3:
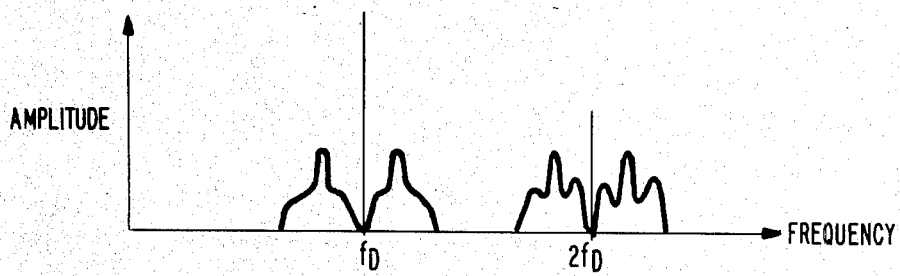
FIGS. 3–7 are sets of waveforms useful in understanding the operation of the system of FIG. 2.
Figure 4:
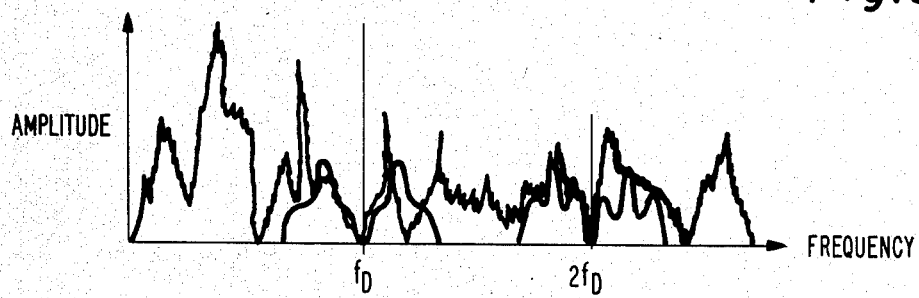

Antenna 20 and transceiver 22 receive back a doppler shifted signal, the doppler shift being a function of the speed of the vehicle toward which antenna 20 is directed, and mixes the transmitted signal with the return doppler shifted signal to produce a doppler signal illustrated ideally in FIG. 3 and more realistically in FIG. 4. In both figures amplitude is depicted on the vertical axis and frequency is depicted on the horizontal axis. The difference between FIGS. 3 and 4 is that in FIG. 4 electrical noise due to other moving objects and noise due to the transceiver itself is present while FIG. 3 illustrates an ideal signal in which only motion of the vehicle of interest is present. With regard to either figure, frequency $f_D$ relates to the speed V toward or away from antenna 20 of the vehicle itself while frequency $2f_D$ relates to the speed toward or away from the antenna of vehicle parts such as the top portion 16a of the tracks which are moving at 2 V. At either side of frequencies $f_D$ and $2f_D$ are upper and lower sidebands, respectively, relating to modulation of the return signal due to motion of the track sections 18 and other moving or vibrating parts of vehicle 12.

Doppler transceiver 22 is coupled to an automatic gain control (AGC) circuit 24. AGC 24 amplifies the low level signals as illustrated in FIGS. 3 and 4 with a wide dynamic range to a constant amplitude output signal more suitable for signal processing than the varying amplitude signal of FIGS. 3 and 4. AGC 24 is coupled to the input of signal processor 26 and as a signal first input to each of voltage control filters 28 and 30. Signal processor 26 extracts the doppler difference frequency $f_D$ from the signal applied thereto and shapes it into a clean squarewave. It produces a frequency $f_D$ which is, for example, 265 hertz/mile/hour of vehicle speed corresponding to doppler transceiver carrier frequency of 94 gHz. Circuit elements 20, 22, 24 and 26 are similar to the type utilized in a standard highway speed detection continuous wave radar system 13 utilized by police in speed limit enforcement (so-called "police radar") except that antenna 22 is of higher gain and greater directivity than the type typically used in police radar units and typically the transmitted frequency is higher.

Processor 26 is coupled to a frequency-to-voltage (F-V) converter 32 which produces a voltage corresponding to frequency $f_D$. F-V converter 32 is coupled to the control inputs of filters 28 and 30 to cause filter 28 to be centered about frequency $f_D$ and to cause filter 30 to be centered about a higher frequency related to motion of some part of the vehicle such as frequency $2f_D$ for tank tracks. It should be understood that the frequency $2f_D$ is chosen because tank tracks 16 of tank 12 (FIG. 1) move at a velocity related to $2f_D$. If the circuit is designed to identify a helicopter, for example, having blades which move at a different speed relative to the speed of the helicopter body, filter 30 would be centered at some other frequency appropriate to the speed of the helicopter blades.

Filters 28 and 30 may be of the type described in U.S. Pat. No. 4,204,171 issued May 20, 1980 to the instant inventor. Filter 28 is set to pass frequency $f_D$ and its upper and lower sidebands while filter 30 is set to pass frequency $2f_D$ and its upper and lower sidebands as illustrated in FIG. 4. Frequencies other than those in passbands around the two frequencies are blocked by both filters. The passbands contain frequencies related to the rate of movement of individual track sections 18 (FIG. 1) which is at a frequency $f_{TR}$. The smaller the track spacing S the greater the frequency $f_{TR}$. The passband must be set to the greatest expected frequency $f_{TR}$.

Therefore, the signals passed by filters 28 and 30 still include the doppler shift frequency as a carrier which is modulated by signals relating to track 16 (FIG. 1) movement. Detectors 34 and 36 remove the doppler frequency carrier by detecting the envelope (This is amplitude modulation detection.) thereby leaving the signal related to track movement. Detectors 34 and 36 are coupled to A and B inputs of a switch circuit 40. A directional microphone 42, which may be physically connected to antenna 20, to be directed toward the same target as that to which antenna 20 is directed, is coupled to an amplifier and AGC circuit 44 of conventional design. The output of amplifier 44 is coupled to terminal C of switch 40. Switch 40 is adapted to be manually controlled to switch any one of, any two of or all three of signals applied at terminals A, B and C to a multiple frequency filter such as a comb filter 46.

Filter 46 is also coupled to receive a control signal from F-V converter 32 and coupled to an adjusting potentiometer 52. The output of filter 46 is connected to an audio amplifier 48 which is connected to a suitable output source such as earphones 50. The purpose of filter 46 is to pass signals applied to the f (frequency) input which are at the track moving frequency $f_{TR}$ and all its harmonics $2f_{TR}$, $3f_{TR}$, etc. A commutating filter is one type of comb filter ideally suited to this application.

As stated before, the rate $f_{TR}$ at which the individual track elements 16a contact the ground is a function of speed of the vehicle and the track to track spacing S of the track elements. The purpose of multiple frequency passband filter 46 is to present to amplifier 48 signals relating to the noise made by the track sections 18. Therefore, filter 46 has two sources of signal for causing it to be adjusted to the desired frequency $f_{TR}$ and its harmonics. The first is from F-V converter 32 which produces a signal corresponding to the speed of vehicle motion to set filter 46 approximately to $f_{TR}$ and its harmonics. The second source is a suitable movable adjusting means such as potentiometer 52 which compensates for the various track spacings S. Potentiometer 52 is adjusted merely by listening in the earphones 50 and adjusting potentiometer 52 until the noise made by the tracks is clearly heard in earphones 50. The operation is similar to the process of turning an automobile radio by first depressing a pretuned pushbutton to approximately tune the radio to a desired station and then adjusting the radio tuning knob to make the station sound clear.

Operation of the vehicle identification system is as follows. Radar antenna 20 and directional microphone 42 are directed toward a sound which the identification system operator believes to be of interest as a potential threat. Transceiver 22 produces a continuous wave carrier signal $f_C$ such as 94 gigahertz which is emitted by antenna 20 toward the vehicle in question. Due to vehicle motion a doppler shifted signal is returned to transceiver 22 wherein mixing occurs to remove the carrier frequency thus leaving only the doppler frequency due to motion of the vehicle itself, movement of the propelling means of the vehicle (tracks or helicopter blades) and signals modulating the doppler frequency signals in accordance with the rate at which tank track elements slap the ground or helicopter blades strike the air as the blades rotate. That is, the signal produced by transceiver 22 as illustrated in FIG. 4 consists of components centered about $f_D$ related to the speed of the vehicle itself and components centered about $2f_D$ related to the speed of the upper portion of tracks 16 (FIG. 1).

The signal produced by transceiver 22 contains, in addition to components relating to the speed of the target such as tank 12 and the speed of its propelling means such as track 16, signals relating to the motion of other vehicles at other speeds but these are of lesser power and of other things such as rustling of trees, etc. Further, in relation to the target of interest the doppler signal is modulated by motion due to reflections from the individual track elements such as 16a as they rotate.

Figure 5:
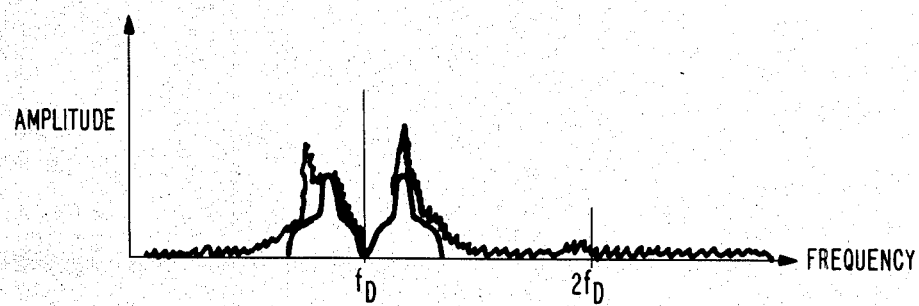
Figure 6:
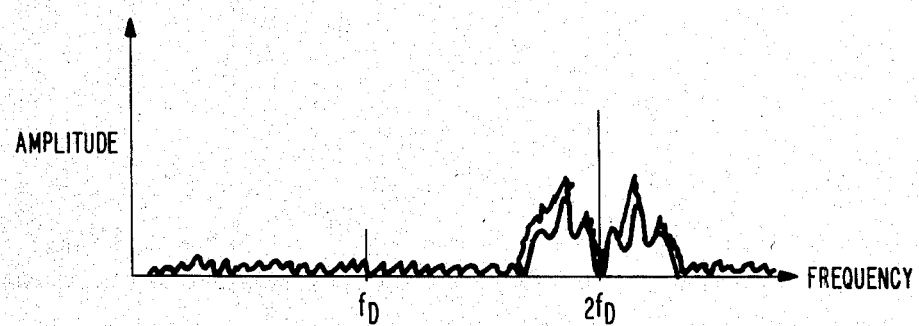

AGC circuit 24 provides an output signal at a constant amplitude thus amplifying weaker portions of the signal produced by transceiver 22. Signal processor 26 determines frequency $f_D$ which is a function of vehicle speed V and produces a squarewave output at frequency $f_D$. F-V converter 32 is receptive of the squarewave at frequency $f_D$ from processor 26 and produces a corresponding voltage, that is, a voltage which is a function of the speed V of the vehicle being identified and which therefore changes in amplitude as V changes. The signal from F-V converter 32 causes filter 28 to operate at a center frequency of $f_D$ and causes filter 30 to operate at a center frequency of $2f_D$. Therefore, filter 28 passes only those signals at $f_D$ and its upper and lower sidebands which contain information relating to vehicle track motion relative to the ground as illustrated in signal waveform FIG. 5 illustrating amplitude on the vertical axis and frequency on the horizontal axis. Filter 30 passes only signals at $2f_D$ and the upper and lower sidebands thereof concerning information relating to track speed and track motion relative to the ground as illustrated in FIG. 6. Frequencies related to other vehicles operating at different speeds and in general any other motion not at the speed related to $f_D$ in the direction to which antenna 20 is pointed are not passed by either filter 28 or 30.

Figure 7:
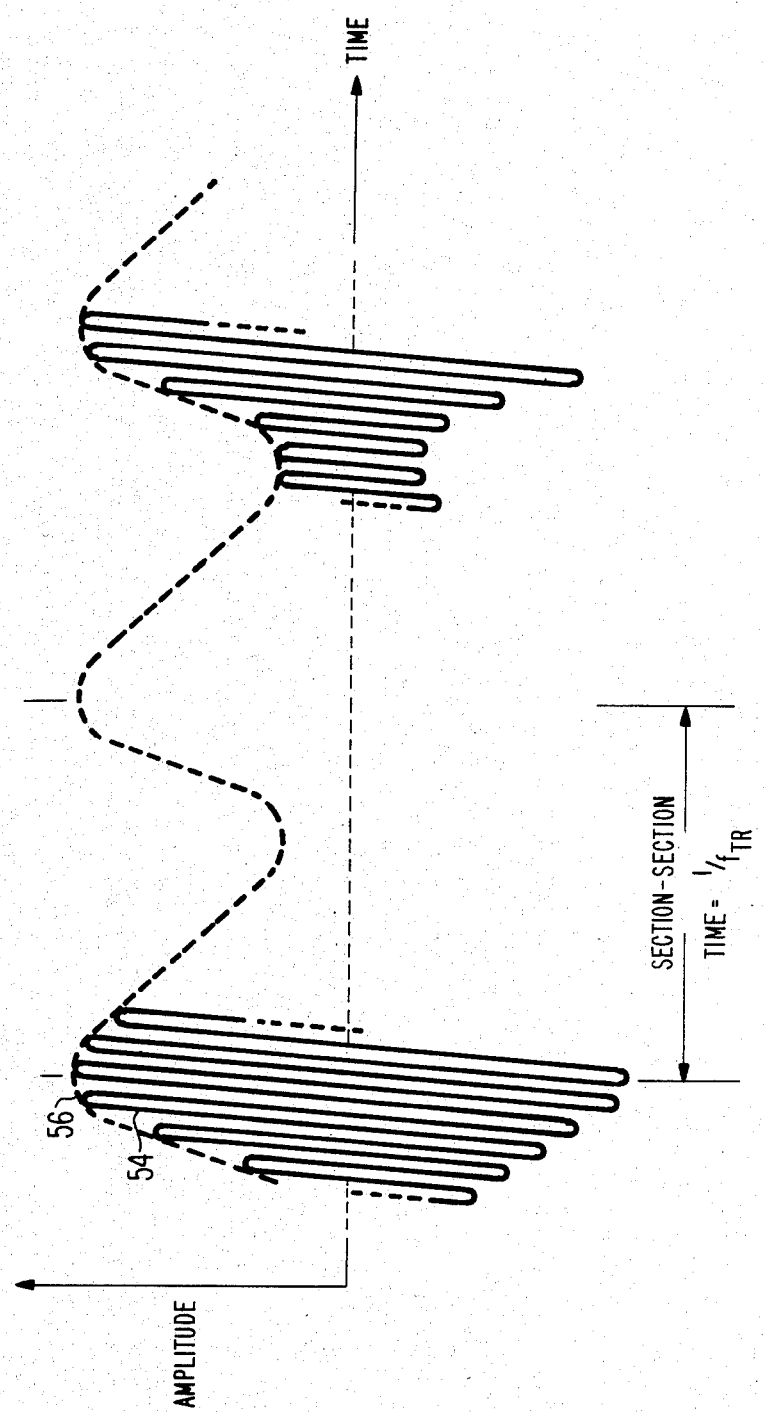

FIG. 7 illustrates the output of filter 28 with amplitude on the vertical axis and time on the horizontal axis. The high frequency carrier component 54 of the signal is at frequency $f_D$ representing the doppler frequency caused by motion of the vehicle. The dashed line 56 along the peaks of the high frequency signal 54 relates to the frequency at which the individual track elements 18 reflect the signal. Its frequency is $f_{TR}$ and period is $1/f_{TR}$. For exemplary tracks and an exemplary vehicle $f_{TR}$ is about 1 Hz/mi./hr. of vehicle speed. Frequency $f_{TR}$ is computed as follows:

$$f_{TR} \text{ in hertz} = \frac{\text{vehicle velocity in length units/second}}{\text{track element spacing in length units}}$$

It is to be understood that the period of the carrier signal 54 is illustrated greatly exaggerated in size for drawing clarity. At the scale to which modulating signal 56 is illustrated carrier 54 would be a blur.

Amplitude detector 34 removes the doppler shift carrier frequency 54 (FIG. 7) thereby leaving only the modulating envelope signal corresponding to the track frequency. The same is true for the combination of filter 30 and detector 36.

Just as radar antenna 20 is receiving signals from the target of interest, microphone 42 is also receiving signals related to a certain extent to engine noise, but primarily to the noise made by tracks squeaking and slapping against the ground. That signal is simply amplified and passed to switch 40. Thus switch 40 is receiving at its three inputs A, B and C signals that relate to the track noises, that is, signals at frequency $f_{TR}$ and harmonics thereof. The purpose of switch 40 is to enable the operator to switch to the output of switch 40 the signals which for him give the best indication of the track noise and therefore give him the best chance of identifying the type of vehicle involved. In a given situation, one operator may choose one combination of A, B and C and another operator may choose a different combination of A, B and C as best suited to his particular hearing ability. Filter 46 is, as mentioned previously, adjusted generally by means of the control signal from F-V 32 related to vehicle speed and more specifically by means of potentiometer 52 so that for a given track spacing it passes signals at the track section advancing frequency $f_{TR}$ and harmonics thereof relating to track noise to amplifier 48.

It will be understood that the setting of potentiometer 52 being directly related to the spacing S of individual track elements, gives an indication of the size of the vehicle since, as was previously stated, there is a general correlation between the size of the tread and the type of the vehicle. The signal received at earphones 50 particularly those components received back from directional microphone 42 is substantially only the sound made by the tank treads and thus is the sound made by the vehicle as heard by an observer who is much closer to the vehicle than the location of the vehicle identification system of FIG. 2.

What is claimed is:

1. A vehicle identification system for identifying a moving vehicle which includes a vehicle propelling means having a portion moving at a multiple of the speed of the vehicle, said propelling means comprising indivdual elements, comprising in combination:

means for directing a continuous wave carrier signal toward said vehicle and for receiving reflected return signals therefrom frequency shifted in accordance with the speed of the vehicle and its propelling means and for removing the carrier leaving the doppler frequencies due to motion of the vehicle and its propelling means, said doppler frequencies including a frequency component $f_D$ due to the motion of the vehicle and a frequency component $X \cdot f_D$ (X greater than 1) due to motion of said portion of said propelling means moving at said multiple X, said frequency components being modulated in accordance with the sound made by the propelling means;

means responsive to frequency $f_D$ produced by said means for receving reflected return signals for producing a control signal having a parameter corresponding to the value of $f_D$;

a first filter responsive to said doppler frequencies and said control signal for passing only frequency $f_D$ and a band of frequencies thereabout relating to the modulation due to movement of the vehicle;

a second filter responsive to siad doppler frequencies and said control signal for passing only frequency $X \cdot f_D$ and a band of frequencies thereabout relating to the modulation due to movement of the individual elements of the vehicle propelling means;

first means coupled to said first filter for removing said doppler frequency thus leaving said modulating signal due to said movement of said vehicle;

second means coupled to the output of said second filter for removing said doppler frequency thus leaving said modulating signal due to said movement of said individual elements; and means responsive to said control signal and of at least one of the signals from said first and second means for producing a signal corresponding to the sound made by the vehicle propelling means individual elements as the vehicle moves, whereby a determination of the type of vehicle may be made.

2. The combination as set forth in claim 1 further including a microphone directed toward said vehicle for receiving therefrom signals corresponding to the sounds made thereby and wherein said means responsive to said control signal and of at least one of the signals from said first and second means is responsive to the signal produced by said microphone.

3. The combination as set forth in claim 1 wherein said means for directing a continuous wave comprises a doppler radar.

4. The combination as set forth in claim 1 wherein said means responsive to said control signal is a commutating filter adapted to pass said frequency $f_D$ and said band of frequencies thereabout relating to the modulation due to the movement of the vehicle and multiples thereof.

5. A vehicle identification system for identifying a moving vehicle which includes a vehicle propelling means having a portion moving at a multiple of the speed of the vehicle, said propelling means comprising individual elements, comprising in combination:

means for directing a continuous wave carrier signal toward said vehicle and for receiving reflected return signals therefrom frequency shifted in accordance with the speed of the vehicle and its propelling means and for removing the carrier leaving the doppler frequencies due to motion of the vehicle and its propelling means, said doppler frequencies including a frequency component $f_D$ due to the motion of the vehicle and a frequency component $X \cdot f_D$ (X greater than 1) due to motion of said portion of said propelling means moving at said multiple X, said frequency components being modulated in accordance with the sound made by the propelling means;

means responsive to frequency $f_D$ for producing a control signal having a parameter corresponding to the value of $f_D$;

a microphone directed toward said vehicle for receiving therefrom signals corresponding to the sounds made thereby;

means receptive of said control signal and of said microphone signals for producing a signal corresponding to the sound made by the vehicle as it moves, whereby a determination of the type of vehicle may be made.

* * * * *